United States Patent
Daniel

(10) Patent No.: US 8,782,041 B1
(45) Date of Patent: Jul. 15, 2014

(54) TEXT SEARCH FOR WEATHER DATA

(75) Inventor: William Todd Daniel, Kennesaw, GA (US)

(73) Assignee: The Weather Channel, LLC, Atlanta, GA (US)

( * ) Notice: Subject to any disclaimer, the term of this patent is extended or adjusted under 35 U.S.C. 154(b) by 686 days.

(21) Appl. No.: 12/535,123

(22) Filed: Aug. 4, 2009

Related U.S. Application Data

(60) Provisional application No. 61/086,137, filed on Aug. 4, 2008.

(51) Int. Cl.
 G06F 7/00 (2006.01)
 G06F 17/30 (2006.01)

(52) U.S. Cl.
 USPC .......................................................... 707/724

(58) Field of Classification Search
 CPC .............. G06F 17/30386; G06F 17/30; G06F 17/30002
 USPC .................... 707/999.101, 706, 724
 See application file for complete search history.

(56) References Cited

U.S. PATENT DOCUMENTS

| | | | |
|---|---|---|---|
| 7,181,345 B2 * | 2/2007 | Rosenfeld et al. ................. 702/3 |
| 7,275,089 B1 * | 9/2007 | Marshall et al. ............... 709/219 |
| 7,756,866 B2 * | 7/2010 | Bhalotia et al. ............... 707/723 |
| 7,792,642 B1 * | 9/2010 | Neilley et al. ..................... 702/3 |
| 7,818,332 B2 * | 10/2010 | Olds et al. ...................... 707/759 |
| 7,849,071 B2 * | 12/2010 | Riise et al. .................... 707/708 |
| 7,958,110 B2 * | 6/2011 | Hood et al. ................... 707/706 |
| 8,463,774 B1 * | 6/2013 | Buron et al. .................. 707/724 |
| 8,484,199 B1 * | 7/2013 | Katragadda et al. .......... 707/723 |
| 2006/0178140 A1 * | 8/2006 | Smith et al. .................... 455/427 |
| 2006/0267783 A1 * | 11/2006 | Smith .......................... 340/601 |
| 2007/0239675 A1 * | 10/2007 | Ragno et al. ...................... 707/3 |
| 2010/0017289 A1 * | 1/2010 | Sah et al. ................... 705/14.49 |
| 2011/0066607 A1 * | 3/2011 | Wong ............................ 707/706 |
| 2012/0101880 A1 * | 4/2012 | Alexander et al. ........... 705/14.5 |

* cited by examiner

*Primary Examiner* — Brannon W Smith
(74) *Attorney, Agent, or Firm* — Meunier Carlin & Curfman, LLC

(57) ABSTRACT

Systems and methods for providing weather data are adapted to receive requests in a free-form format, such as a text input, and specifying a geographic area. The system is adapted to identify geographic areas likely corresponding to the free-form input and retrieve weather data corresponding to those identified geographic areas from a weather observation location proximate to the geographic area.

16 Claims, 3 Drawing Sheets

TEXT SEARCH FOR WEATHER DATA

CROSS-REFERENCE TO RELATED APPLICATION

The present application claims priority to U.S. Patent Application No. 61/086,137, filed Aug. 4, 2008, entitled "Text Search for Weather Data," which is incorporated herein by reference in its entirety.

BACKGROUND

Weather information has traditionally been accessible through media such as television and newspapers. For example, viewers of television are provided with programming that may provide current weather conditions and weather forecasts for those geographic areas selected by the creator of the programming. Consumers of newspapers similarly are provided with weather conditions and weather forecasts for those geographic areas that are selected by the publisher of the newspapers.

SUMMARY

Applicant discloses new systems and methods for providing weather data. In an exemplary embodiment, the systems and methods are adapted to receive requests specifying a free-form input, such as a text input, specifying a geographic area. In an exemplary embodiment, the system is adapted to identify geographic areas likely corresponding to the free-form input and retrieve weather data corresponding to those identified geographic areas.

In an exemplary embodiment, a system comprises a server system that is adapted to receive requests for weather data from user devices such as, for example, phones, personal digital assistants, laptop computers, or any other device that may be adapted to forward a request. The server system is communicatively coupled to data stores of geographic data. The server system is likewise communicatively coupled to data stores of weather data including, for example, observed weather conditions and forecast weather conditions.

In an exemplary embodiment, the system receives a request for weather data. In an embodiment, the request comprises a text input meant to identify a particular place or location. For example, the text input may identify at least any of the following: City Name; City and State; City and Country; Postal Code; State Name (Pulls the most populated cities in the state); County Name; County and State Names; Airport Code; Street Name; Street Address (or portion of address, such as, street and city); and Point of Interest (such as, for example, a national park, monument, oil rig, school, golf course, lake, bridge, mountain name, et cetera). In an exemplary embodiment, the server system may process the text input to identify phonetically misspelled place names. For example, the server system may access a thesaurus database to identify a place name corresponding to the text input.

In an exemplary embodiment, the server system searches one or more databases comprising geographic locations for those database entries that may match the received place name. The system compares the results of the database search, e.g., the place names from the databases, to the text of the received input and identifies (perhaps, by ranking) the results that exhibit a likelihood of matching the text of the received input.

In an exemplary embodiment, the server system further processes those results identified as likely matching the received input text to identify the results that are within a predefined distance, e.g., within 20 miles, of a particular location. In an exemplary embodiment, the locations within a defined proximity of the closest weather observation station are identified. In other embodiments, those locations closest to a stored home location for a user or global positioning reading may be identified.

In an exemplary embodiment, for those locations that have been identified, the server system identifies the weather observation stations in the vicinity, e.g., within 20 miles, and selects the one closest to each of the search results.

In an exemplary embodiment, the server system then queries the weather data store to retrieve weather data for the identified weather observation stations. The retrieved weather data and identifying geographic information are transmitted to the requesting device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Figure 1:
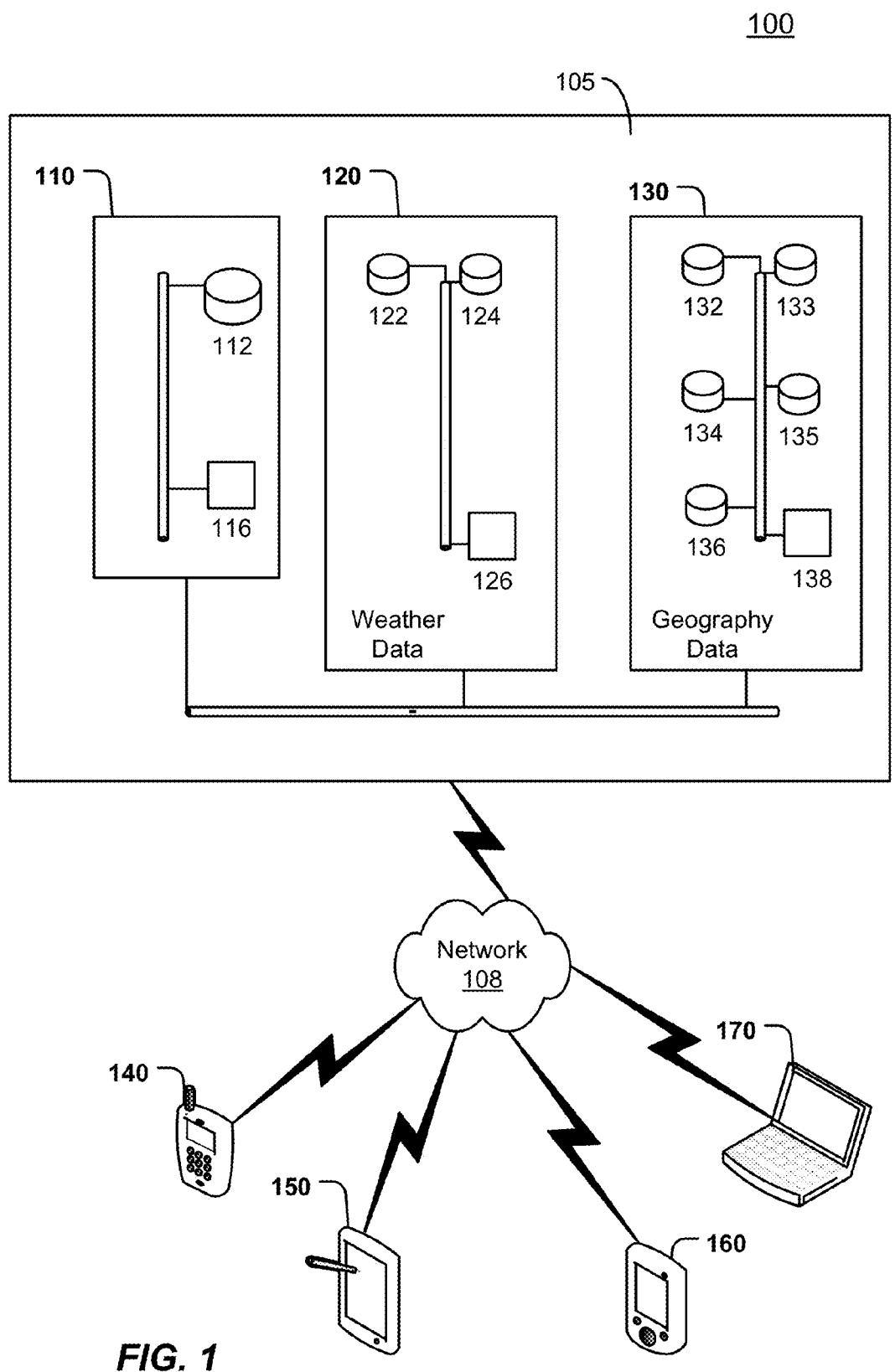
FIG. 1 depicts an example system for providing weather data.

FIG. 1 is a diagram depicting an exemplary system for providing weather data. Users employ electronic devices 140, 150, 160, and 170 to input requests for weather data. The electronic devices may be, for example, telephones, personal digital assistants, laptop computers, desktop computers, tablet computers, or any other device adapted to receive an input from the user specifying a geographic location. In an exemplary embodiment, devices 140, 150, 160, and 170 are adapted to allow users to enter free-form inputs specifying geographic locations. For example, devices 140, 150, 160, and 170 may be adapted to enter text inputs. In an embodiment, devices 140, 150, 160, and 170 may be adapted to enter geographic locations by voice inputs which may subsequently converted to a text value.

Requests from devices 140, 150, 160, and 170 are communicated over network 108 to weather server system 105. Network 108 may be any network that is adapted to communicate data as described herein. For example, network 108 may comprise all or a portion of any of the following: a local area network, a wide area network, an intranet, an extranet, and the Internet. Further, network 108 may comprise any network topologies and technologies suitable for moving data including, for example, wireline, wireless, TCP/IP, etc.

Requests for data are received at weather server system 105 and initially serviced by data server system 110. Data server system 110 comprises request server 116 that may be communicatively coupled to database 112. Request server 116 is adapted to receive requests for weather data and interface with weather data system 120 and geography data system 130 as described below to derive weather data corresponding to user requests. Database or data store 112 may comprise information referenced by request server 116 during processing of user requests. For example, database 112 may comprise information about users of the system, the received requests, data communicated in response to user requests, etc. In an exemplary embodiment, database 112 may comprise information about the user devices including, for example, a global positioning reading for the current location of user devices. For example, the location of the devices may be specified using a latitude or longitude pair.

Data server system 110 is communicatively coupled to weather data system 120. Weather data system 120 is adapted to provide weather data corresponding to geographic locations. Weather data system 120 may comprise a weather server 126 adapted to retrieve data from weather databases 122 and 124. In an exemplary embodiment, weather databases 122 and 124 comprise weather information for various locations. The weather information may be observed weather data collected at various geographic locations. The weather information may also comprise weather forecast data.

The weather may be collected from various sources. For example, in an exemplary embodiment, database 122 may comprise data collected by the National Weather Service and database 124 may comprise data gathered by the High-Resolution, Real-Time Synthetic Meteorological Conditions from Radar Data (HIRAD) system as described in U.S. Pat. No. 7,231,300, the contents of which are hereby incorporated by reference herein. In an exemplary embodiment, a portion of the weather data stored in databases 122 and 124 corresponds to weather observation stations or locations. In other words, the weather data specifies the locations at which the weather data was collected. In an exemplary embodiment, the weather location comprises for each observation station or location, location identifier information. For example, in an exemplary embodiment, the location identifier information may comprise latitude and longitude pairs corresponding to the particular observation station or location.

Weather data system 120 and data server system 110 are communicatively coupled to geographic data system 130. Geographic data system 130 is adapted to respond to requests for geographic information. In an exemplary embodiment, system 130 comprises a geographic data server 138 that is communicatively coupled to database servers 132, 133, 134, 135, and 136. Geographic data server 138 is adapted to receive requests for geographic data, search servers 132, 133, 134, 135, and 136, and communicate the results.

Databases 132, 133, 134, 135, and 136 comprise geographic data stored in various formats and regarding various geographic classifications. For example, the databases may comprise data regarding any and/or all of the following: City Name; City and State; City and Country; Postal Code; State Name; County Name; County and State Names; Airport Code; Street Name; Street Address (or portion of address, such as, street and city); Point of Interest (such as, for example, a national park, monument, oil rig, school, golf course, lake, bridge, mountain name, et cetera); and latitude and longitudes.

In an exemplary embodiment, database 132 comprises geocoded data. For example database 132 may comprise the latitude and longitude coordinates for locations such as cities, states, points of interest, etc.

In an exemplary embodiment, database 133 may comprise data regarding various cites including, for example, city names, corresponding related geographic entities such as states, etc.

In an exemplary embodiment, database 134 may comprise points of interest data. For example, database 134 may comprise the names and locations of landmarks such as parks, monuments, popular stores, buildings, natural formations, or any other location that users may use to identify locations.

In an exemplary embodiment, database 135 comprises weather observation station data. For example, database 135 may comprise information such as names relating to the stations or locations where weather data was collected for inclusion in weather data system 120. In an exemplary embodiment, some of the weather observation stations may correspond to locations of airports.

In an exemplary embodiment, database 136 comprises data corresponding to user specified weather observation stations. For example, in an exemplary embodiment users of the system may input weather observations for particular areas. The weather information may comprise, for example temperature, barometric pressure, humidity, time, and any other weather observations. This observed weather data may be stored in weather data system 120. Database 136 may comprise location information for the user specified observation locations. For example, database 136 may comprise latitude/longitude pairs for the user specified observation locations.

Figure 2:
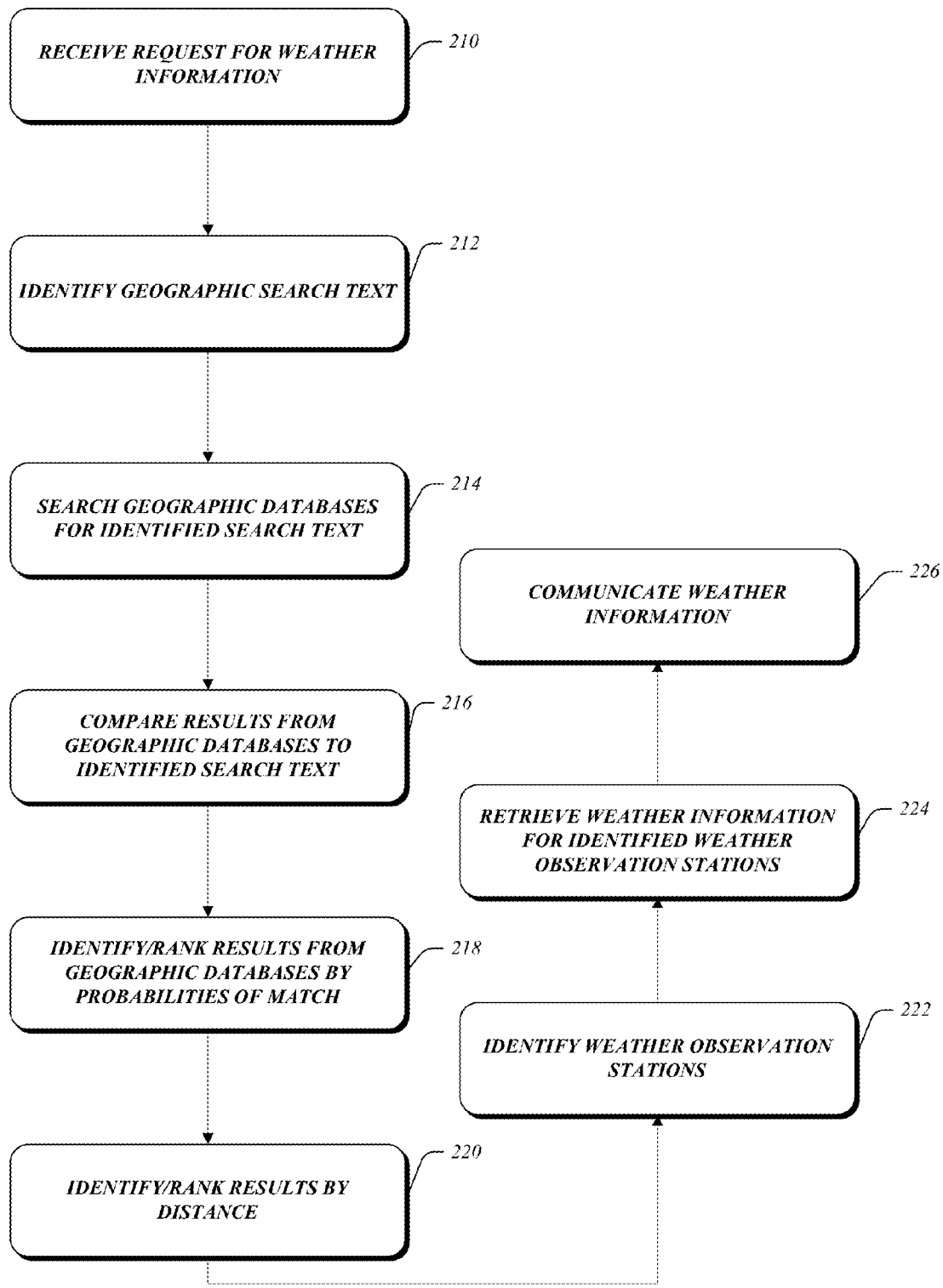
FIG. 2 depicts a flow diagram of an example method for providing weather data.

FIG. 2 provides a flow chart depicting an exemplary process employed by system 105 for responding to requests for weather data. As shown, at step 210, system 105 receives a request for weather data. The request may take any of numerous forms but generally comprises a location specification. In an exemplary embodiment, the request is a free-form request comprising a text input. In another embodiment, the request comprises a voice input that may be translated by, for example, server 116, into a text input corresponding to the voice input.

In an exemplary embodiment, the request comprises a text input meant to identify a particular place. The text input may comprise a single line of text. For example, the text input may identify at least any of the following: City Name; City and State; City and Country; Postal Code; State Name (Pulls the most populated cities in the state); County Name; County and State Names; Airport Code; Street Name; Street Address (or portion of address, such as, street and city); Point of Interest (such as, for example, a national park, monument, oil rig, school, golf course, lake, bridge, mountain name, et cetera); and latitude/longitude pair (i.e., a global positioning reading).

At step 212, server 116 may process the search input to identify the search criteria or text. For example, in an exemplary embodiment, server system 116 may process the input to identify phonetically misspelled place names. The server system may access a thesaurus database to identify a place name corresponding to the text input.

At step 214, server 116 causes geographic data system 130 to search one or more of geographic databases 132, 133, 134, 135, and 136 for those database entries that may match the received search criteria, i.e. input text. For example, data system 130 may search its databases for names of cities, counties, states, points of interest, etc. that bear a resemblance to the text received from the user.

At step 216, server 116 may compare the user input search text with the information stored in the database for those entries that the search identified as resembling the input text. For example, in an exemplary embodiment, server 116 may perform a Bayesian test on the names returned from the database search with the input search text.

At step 218, server 116 identifies those results that show a likelihood of possibly matching the user input search text ("candidate" results). For example, server 116 may compares the results of the database search (i.e., the results of steps 214 and/or 216), and in particular, the place names from the databases, to the text of the received input. Server 116 may rank the results that exhibit a likelihood of matching the text of the received input.

At step 220, server 116 may rank or otherwise identify those locations that were previously identified as possibly being a match based upon the distance of the location from a particular location. For example, in an exemplary embodiment, those locations from the database that bear a resemblance to the input text (i.e., those identified at step 218) may be ranked based upon proximity (e.g., within 20 miles) to the nearest weather observation location. In an exemplary embodiment, the top 50 matches from step 218 are ranked based on proximity to the nearest weather observation location. Alternatively, the locations may be ranked based upon the proximity to the global positioning reading received from the input device. In yet another embodiment, the locations may be ranked based upon the proximity to a stored "home" location corresponding to the user or device from which the request was received.

At step 222, server 116 communicates with weather data system 120 and geographic data system 130 to identify the weather observation locations within the vicinity of the locations that have been identified as likely candidates for matching the user input text (i.e., locations identified at step 220). In an exemplary embodiment, weather observation locations within 20 miles may be identified. In an exemplary embodiment, the top ranked locations from step 220 may be processed to identify closest weather observation stations. This processing may be performed by comparing the latitude/longitude pairs of the identified locations with the latitude/longitude pairs of the weather observation stations.

At step 224, server 116 cooperates with weather data system 120 to retrieve weather data corresponding to the locations believed to possibly correspond to the user input text. In an exemplary embodiment, weather data is retrieved for the weather observation locations identified at step 222. The weather information that is retrieved may be any and all weather data that may be available including that available in databases 122 and 124. Furthermore, in an exemplary embodiment, map data may be retrieved corresponding to the identified locations. The map data may be stored in system 105 or any other system such as, for example, systems provided by Google, Inc.

At step 226, server 116 communicates the locations that have been identified as possibly corresponding to the input text to the user device from which the request was received. The communication may comprise a listing of potential locations with a corresponding rank as to the likelihood the location corresponds to the input text. Further, the communicated data may comprise weather data for each of the locations. The weather data may comprise observed weather data and forecasted weather data.

Figure 3:
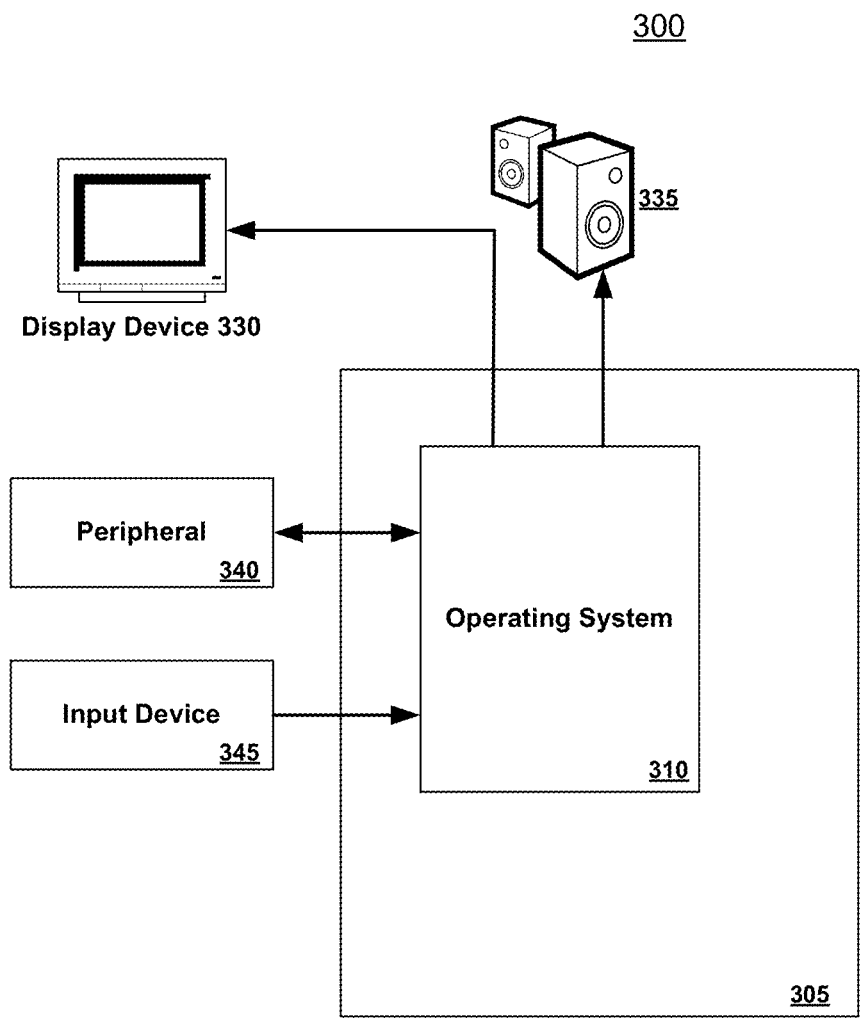
FIG. 3 depicts a block diagram of an example computing system for use in providing weather data.

FIG. 3 depicts an example embodiment of a computing system 300 that may be used in a system for providing weather data. For example, computing system 300 may be used for example to implement any of servers 116, 126, and 138. Likewise, computing system 300 may be modified to implement computing devices 140, 150, 160, and 170. As shown in FIG. 3, the computing system 300 may include an electronic device 305 which may be, for example, a programmable computer, a server computer, a handheld device including, for example, a PDA, a telephone, a tablet PC, or the like. The electronic device 305 may be connected to one or more input and/or output devices. For example, the electronic device 305 may be connected to the following input/output devices: a display device 330 such as a monitor or the like; an audio device 335 such as a speaker, headphones, or the like; and/or an input device 345 such as a keyboard, a stylus, a mouse, a touch screen, a microphone, or the like. The input/output devices, in some embodiments, may be physically integrated in the electronic device 305. For example, in one embodiment, the electronic device 305 may be a laptop computer that may include a keyboard, mouse, and display device integrated therein. In another embodiment, electronic device 305 may be a wireless telephone or PDA with a keyboard, scrolling input, and display.

The computing system 300 may also include a peripheral 340. The peripheral 340 may be an external and/or internal device optionally connected to the electronic device 305 such as a printer, an external and/or internal CD-ROM, DVD-ROM, CD Writer, DVD Writer, a Flash drive, an external media drive, or the like.

The electronic device 305 may include hardware components such as a processor, a graphics card, a storage component, a memory component, an antenna, a communication port, or the like. The electronic device 305 may also include software components such as an operating system 310 and/or any other suitable application that may control the hardware components and/or may instruct the electronic device 305 to perform any necessary tasks including those described above. Those skilled in the art will appreciate that the operating system 310 and any other software applications thereon may be stored in the memory and execute on the processor of device 305.

The operating system 310 may be a software component or application executing on the electronic device 105 that may be responsible for managing the resources such as the hardware components, input devices, output devices, peripherals, or the like connected to or integrated into the electronic device 305. According to example embodiments, the operating system 310 may provide services to applications executing on the electronic device 105 through application programming interfaces (APIs) such that the applications may access function calls of the operating system 310. The operating system 310 may also include a Graphical User Interface (GUI) that may be provided to a user via, for example, the display device 335 such that the user may interact with graphical elements provided by the GUI to perform actions using the operating system 310 or other applications executing on the electronic device 305. According to an example embodiment, the operating system 310 may include a Microsoft® operating system such as Windows® 98, Windows® NT, Windows® 2000, Windows® XP, Windows® Vista, or the like that may support the Microsoft®.NET Framework.

Thus, exemplary embodiments of systems and methods for providing an interactive application interface have been disclosed. An illustrative system provides user-friendly way to request and receive weather data. The system receives a free-form user input meant to reflect a geographic location. The system searches a geographic database to identify locations likely corresponding to the free-from input. The system then identifies for the identified locations the weather observation locations in proximity to the identified locations. The system retrieves weather data for the weather observation locations and communicates that weather information to the user.

Thus, the disclosed systems and methods enable a very user friendly way of searching weather current conditions or forecast data using simple single line text input. Once the single line of text is entered, the system uses a collection of databases to obtain geographical information that is then cross referenced to a collection of weather observation databases. Once the search is completed, any or all of the locations returned have current condition and forecast data associated with them. The system may be implemented on mobile devices as a standalone search engine as well as on backend servers.

Thus, using a single text line of input, such as a street address, street name, city name, county name, point of interest (national parks, golf course, oil rigs, state name, airport code, postal code or latitude/longitude) a user may retrieve weather observation locations in order of relevance or distance to a user's current location or stored "home" location.

While example embodiments of a various methods for providing an interactive computing interface have been described, the underlying concepts may be performed in a variety of systems including for example, personal computers, set-top boxes, servers, personal digital assistants, or the like. Additionally, the underlying concepts may be embodied in the form of computer executable instruction (i.e., program code) stored on a computer-readable storage medium which instructions, when executed by a machine, such as a computer, perform and/or implement the methods and systems described above. Specifically, any of the steps, operations or functions described above may be implemented in the form of such computer executable instructions. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can be accessed by a computer.

What is claimed:

1. A method implemented on at least one computing system of providing weather data, comprising:
   receiving a request for weather information at a server;
   identifying geographic search criteria from the request;
   searching a database for geographic locations corresponding to the geographic search criteria;
   ranking results from the search for geographic locations in order based on a likelihood of matching the geographic search criteria for the request;
   ranking a top predetermined number of the ranked results from the search for geographic locations based on proximity to a closest respective weather observation station;
   retrieving weather information from a weather database for the top predetermined number of the ranked results from the search for geographic locations; and
   communicating the retrieved weather information for the top predetermined number of the ranked results from the search for geographic locations, wherein the communication comprises a respective likelihood of matching the geographic search criteria for the request and weather data associated with each of the top predetermined number of the ranked results from the search for geographic locations.

2. The method of claim 1, wherein the request is free-form text including one of a city name, a postal code, a street name, a county name, a point of interest, and a latitude/longitude pair.

3. The method of claim 1, further comprising:
   determining phonetically misspelled locations within the geographic search criteria; and
   searching the database for geographic locations corresponding to geographic locations that approximate the phonetically misspelled locations.

4. The method of claim 1, further comprising performing a Bayesian test on the geographic locations corresponding to the geographic search criteria to compare the geographic locations with the request.

5. The method of claim 1, further comprising ranking the top predetermined number of the ranked results from the search for geographic locations based upon proximity to a received global positioning reading.

6. The method of claim 1, further comprising ranking the top predetermined number of the ranked results from the search for geographic locations based upon proximity to a stored home location corresponding to a device from which the request was received.

7. The method of claim 1, further comprising determining a closest respective weather observation station by comparing latitude/longitude pairs of each of the top predetermined number of the ranked results from the search for geographic locations with the latitude/longitude pairs of each of a plurality of weather observation stations.

8. The method of claim 7, further comprising:
   retrieving weather data corresponding to a predetermined number of closest weather observation stations that correspond to the request; and
   communicating observed weather data and forecasted weather data for each of the predetermined number of closest weather observation stations.

9. The method of claim 8, further comprising communicating map data corresponding to the predetermined number of closest weather observation stations.

10. A method implemented on at least one computing system of providing weather data, comprising:
    receiving a request for weather information for a location at a server;
    ranking candidate geographic locations from a geographic database that match the location within a confidence level;
    determining weather observation stations proximate to each of a predetermined number of the candidate geographic locations, respectively;
    ranking the top predetermined number of the ranked results from the request for candidate geographic locations based on proximity to the weather observation stations; and
    communicating weather information associated with the weather observation stations in response to the request, wherein the communication comprises a respective confidence level and weather data associated with each of the top predetermined number of the ranked results from the request for candidate geographic locations.

11. The method of claim 10, wherein the location is one of a geographic location, a point of interest, an airport and a latitude/longitude pair.

12. The method of claim 10, further comprising:
    correcting a misspelled location received with the request to determine a corrected location; and
    determining the candidate geographic locations from the corrected location.

13. The method of claim 10, further comprising ranking the weather observation stations within a predetermined distance for a candidate geographic location having a highest likelihood of corresponding to the location.

14. The method of claim 10, further comprising:
    receiving positioning information from a device from which the request was received;
    ranking a candidate geographic location having a highest likelihood of corresponding to the location based upon the positioning information.

15. The method of claim 14, wherein the positioning information is global positioning coordinate data that is communicated by the device.

16. The method of claim 14, wherein the positioning information is a home location stored within the device.

\* \* \* \* \*